US009863319B2

(12) United States Patent
Farah et al.

(10) Patent No.: US 9,863,319 B2
(45) Date of Patent: Jan. 9, 2018

(54) SPLIT-ZONE FLOW METERING T-TUBE

(71) Applicant: United Technologies Corporation, Hartford, CT (US)

(72) Inventors: Jorge I. Farah, Hartford, CT (US); Kalpendu J. Parekh, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 397 days.

(21) Appl. No.: 14/429,167

(22) PCT Filed: Mar. 1, 2013

(86) PCT No.: PCT/US2013/028537
§ 371 (c)(1),
(2) Date: Mar. 18, 2015

(87) PCT Pub. No.: WO2014/051672
PCT Pub. Date: Apr. 3, 2014

(65) Prior Publication Data
US 2015/0233295 A1   Aug. 20, 2015

Related U.S. Application Data

(60) Provisional application No. 61/707,534, filed on Sep. 28, 2012.

(51) Int. Cl.
*F02C 7/18* (2006.01)
*F02C 3/045* (2006.01)
(Continued)

(52) U.S. Cl.
CPC ................. *F02C 7/18* (2013.01); *F01D 5/08* (2013.01); *F01D 5/18* (2013.01); *F01D 9/065* (2013.01); *F02C 3/045* (2013.01); *F02C 7/20* (2013.01)

(58) Field of Classification Search
CPC ...... F01D 5/08; F01D 5/18; F01D 9/06; F01D 9/065; F01D 25/12; F01D 25/14;
(Continued)

(56) References Cited

U.S. PATENT DOCUMENTS 3,034,298 A  *  5/1962  White .................... F01D 11/10
                                                           415/116
3,108,767 A     10/1963  Eltis et al.
(Continued)

FOREIGN PATENT DOCUMENTS

EP    2447503    8/2011
EP    2431590    3/2012
(Continued)

OTHER PUBLICATIONS

Supplementary European Search Report for European Patent Application No. 13842149 completed Apr. 19, 2016.
(Continued)

*Primary Examiner* — Steven Sutherland
(74) *Attorney, Agent, or Firm* — Carlson, Gaskey & Olds, P.C.

(57) ABSTRACT

A gas turbine engine includes a core engine that has a compressor section, a combustor section and a turbine section. A thermal management system is configured to receive a cooling stream. The thermal management system includes a metering device that is located near an outer diameter of the core engine. The metering device is configured to divide the cooling stream into multiple segregated passages. The metering device can be configured to divide the cooling stream between a first passage and a second passage that is concentric with the first passage.

21 Claims, 3 Drawing Sheets

(51) Int. Cl.
*F01D 9/06* (2006.01)
*F02C 7/20* (2006.01)
*F01D 5/18* (2006.01)
*F01D 5/08* (2006.01)

(58) Field of Classification Search
CPC .. F01D 25/08; F01D 25/10; F02C 6/08; F02C 7/12; F02C 7/18; F02C 7/20; F05D 2240/91; F05D 2260/20
USPC ........................................ 60/226.1, 805, 806
See application file for complete search history.

(56) References Cited

U.S. PATENT DOCUMENTS

| | | | |
|---|---|---|---|
| 3,369,366 A | 2/1968 | Howald | |
| 3,628,880 A * | 12/1971 | Smuland | F01D 5/189 415/115 |
| 4,321,007 A * | 3/1982 | Dennison | F01D 25/162 415/142 |
| 4,882,902 A * | 11/1989 | Reigel | F01D 5/082 415/115 |
| 4,919,590 A * | 4/1990 | Stratford | F04D 29/321 415/116 |
| 5,163,285 A * | 11/1992 | Mazeaud | F01D 5/08 60/806 |
| 5,313,779 A | 5/1994 | Rodgers | |
| 5,482,431 A * | 1/1996 | Taylor | F01D 9/065 415/111 |
| 5,645,397 A * | 7/1997 | Soechting | F01D 5/187 415/115 |
| 6,398,485 B1 * | 6/2002 | Frosini | F01D 5/08 415/115 |
| 6,625,989 B2 | 9/2003 | Boeck | |
| 6,672,072 B1 | 1/2004 | Giffin, III | |
| 7,093,419 B2 | 8/2006 | McCaffrey et al. | |
| 7,287,384 B2 | 10/2007 | Fish et al. | |
| 8,276,392 B2 | 10/2012 | Van Der Woude | |
| 8,863,531 B2 * | 10/2014 | Scott | F02C 7/18 415/115 |
| 2009/0081025 A1 | 3/2009 | Lutjen et al. | |
| 2011/0079020 A1 | 4/2011 | Durocher et al. | |

FOREIGN PATENT DOCUMENTS

| | | |
|---|---|---|
| FR | 1325291 | 4/1963 |
| GB | 2263946 | 8/1993 |
| WO | 2013067361 | 5/2013 |
| WO | 2014008129 | 1/2014 |

OTHER PUBLICATIONS

International Preliminary Report on Patentability for PCT Application No. PCT/US2013/028537, dated Apr. 9, 2015.
International Search Report and Written Opinion for International Application No. PCT/US2013/028537 completed on Nov. 21, 2013.

* cited by examiner

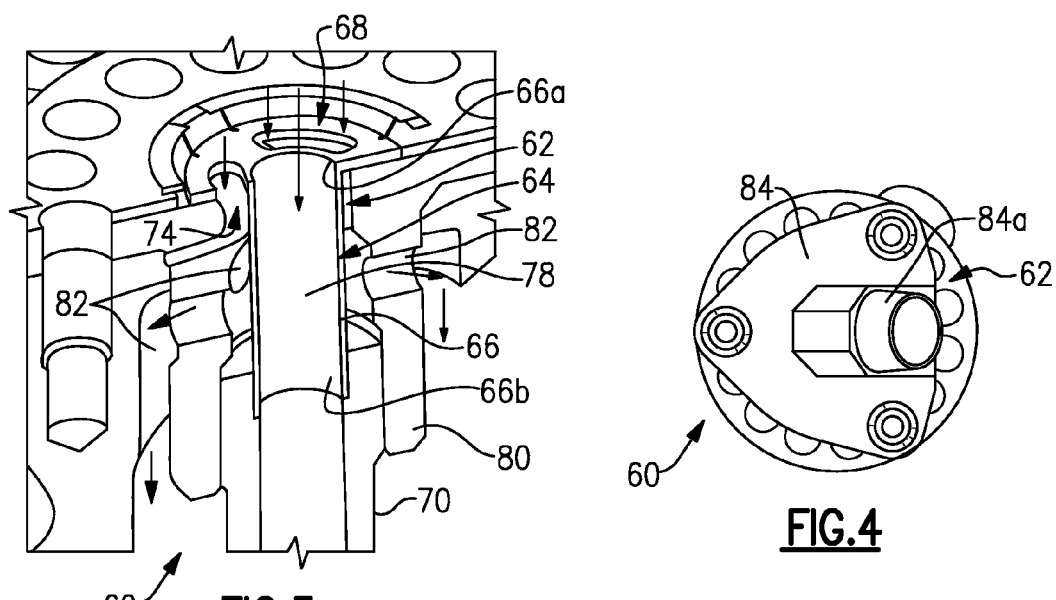
FIG.3
FIG.4
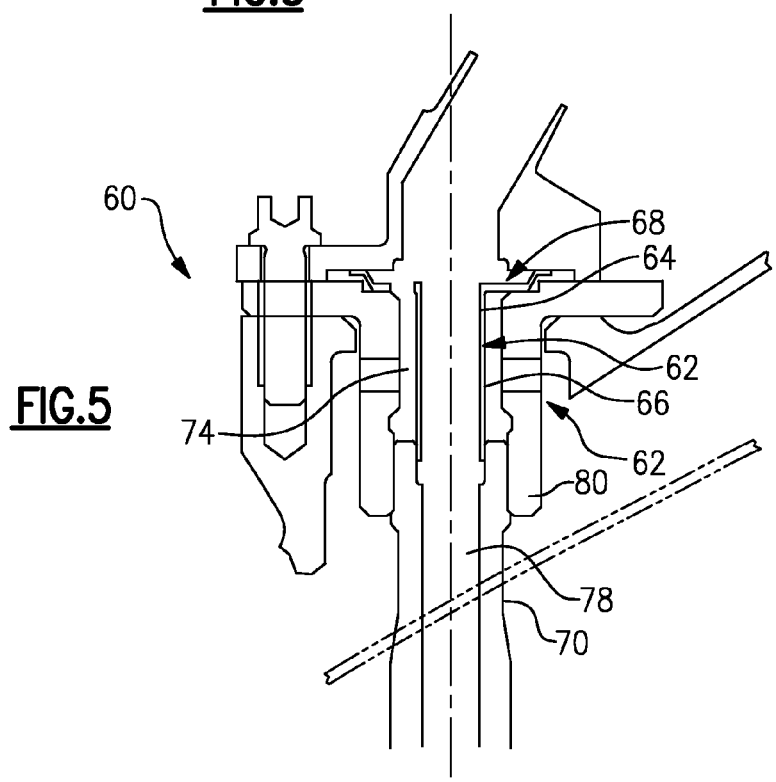
FIG.5
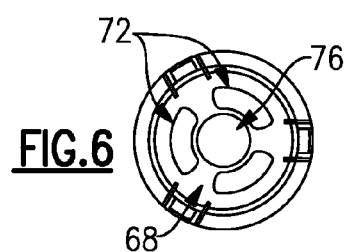
FIG.6

SPLIT-ZONE FLOW METERING T-TUBE

CROSS REFERENCE TO RELATED APPLICATION

This application claims priority to U.S. Provisional Application No. 61/707,534, which was filed 28 Sep. 2012 and is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Turbine engine manufacturers continue to seek further improvements to engine performance and assembly including improvements to thermal, transfer, assembly and propulsive efficiencies.

SUMMARY

A gas turbine engine according to an exemplary aspect of the present disclosure includes a core engine that has a compressor section, a combustor in fluid communication with the compressor section, and a turbine section in fluid communication with the combustor. A thermal management system is configured to receive a cooling stream. The thermal management system includes a metering device located near an outer diameter of the core engine. The metering device is configured to divide the cooling stream into multiple segregated passages.

In a further non-limiting embodiment of any of the foregoing examples, the thermal management system is connected to the compressor section and the cooling stream is bleed air.

In a further non-limiting embodiment of any of the foregoing examples, the metering device is located at the outer diameter of the turbine section.

In a further non-limiting embodiment of any of the foregoing examples, the turbine section includes a first turbine section and a second turbine section downstream of the first turbine section, and the outer diameter is of the first turbine section.

In a further non-limiting embodiment of any of the foregoing examples, at least one of the multiple segregated passages leads to the second turbine section.

In a further non-limiting embodiment of any of the foregoing examples, the multiple segregated passages include a first passage and a second passage that is concentric with the first passage.

In a further non-limiting embodiment of any of the foregoing examples, at least a portion of the metering device is located radially outwards of the outer diameter relative to the central axis of the core engine.

In a further non-limiting embodiment of any of the foregoing examples, the multiple segregated passages extend into a radially outer end of an airfoil, through the airfoil and out from a radially inner end of the airfoil.

In a further non-limiting embodiment of any of the foregoing examples, the multiple segregated passages extend through an airfoil.

A gas turbine engine according to an exemplary aspect of the present disclosure includes a compressor section, a combustor in fluid communication with the compressor section, and a turbine section in fluid communication with the combustor. A thermal management system is operable to receive a cooling stream. The thermal management system includes a metering device that is configured to divide the cooling stream between a first passage and a second passage that is concentric with the first passage.

In a further non-limiting embodiment of any of the foregoing examples, the metering device includes a plurality of orifices opening to the first passage and a central orifice opening to the second passage.

In a further non-limiting embodiment of any of the foregoing examples, the plurality of orifices is arranged circumferentially around the central orifice.

In a further non-limiting embodiment of any of the foregoing examples, the first passage is an annular passage.

In a further non-limiting embodiment of any of the foregoing examples, the metering device includes a t-shaped tube having a tube portion attached at one end to an orifice plate.

In a further non-limiting embodiment of any of the foregoing examples, the tube portion is attached at an opposed end to another tube extending coaxially therewith.

In a further non-limiting embodiment of any of the foregoing examples, the metering device is located near an outer diameter of the core engine.

In a further non-limiting embodiment of any of the foregoing examples, the first passage and the second passage extend into a radially outer end of an airfoil, through the airfoil and out from a radially inner end of the airfoil.

A method, according to an exemplary aspect of the present disclosure, for dividing a cooling stream in a thermal management system of a gas turbine engine includes providing a cooling stream into a thermal management system of a gas turbine engine, dividing the cooling stream into multiple segregated streams at a location near an outer diameter of a core engine of the gas turbine engine, and providing the multiple segregated streams to different components of the engine.

In a further non-limiting embodiment of any of the foregoing examples, the different components are a first turbine section and a second turbine section that is located downstream from the first turbine section.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3 illustrates a perspective, cutaway view of a metering device of the thermal management system of FIG. 2.

FIG. 4 illustrates a top-down view of the metering device of FIG. 2.

FIG. 5 illustrates a schematic cross-sectional view of the metering device of FIG. 2.

FIG. 6 illustrates a view of an orifice plate of the metering device of FIG. 2.

DESCRIPTION

Figure 1:
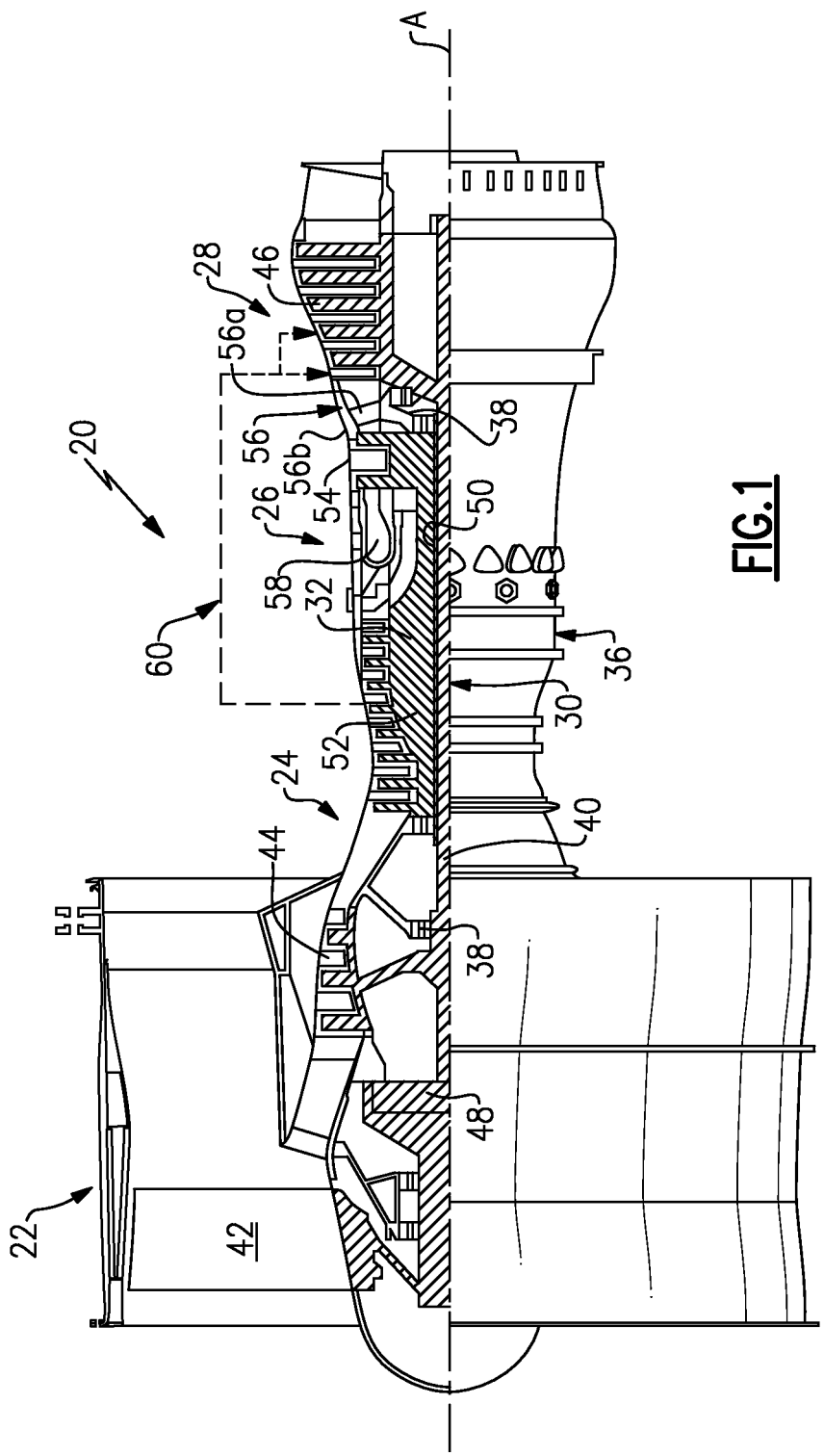
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The compressor section 24, the combustor section 26 and the turbine section 28 constitute a core of the engine 20. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans and the teachings may be applied to other types of turbine engines, including single-spool architectures, three-spool architectures and ground-based turbines that do not include the fan section 22.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure.

The engine 20 also includes a mid-turbine section 56, (or mid-turbine frame, "MTF") having a plurality of airfoil 56a (one shown, here a static vane). The mid-turbine section 56 is located axially between the first turbine 54 (e.g., high pressure turbine, "HPT") and the second turbine 46 (e.g., low pressure turbine, "LPT"). Thus, in this example, the turbine section 28 includes three sections, 46, 54 and 56, which are further considered to be, with no particular implication of the order, first, second and third turbine sections. As can be appreciated, the airfoils 56a orient core gas flow through the turbine section 28 in an axial direction. Aerodynamic loads on the airfoils 56a are transferred to a static engine case 56b, which represents an outer periphery or outer diameter of the engine core (relative to engine central axis A).

An annular combustor 58 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 58, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.5. "Low corrected fan tip speed" is the actual fan tip speed in feet per second divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 feet per second.

As shown schematically in FIG. 1, the engine 20 can utilize a thermal management system 60 to convey relatively cool air, such as from the compressor section 24, to other, relatively hot components. For example, the thermal management system 60 is configured to receive relatively cool air from the compressor section 24 to cool airfoils, such as rotatable blades or static vanes, in multiple turbine stages or sub-sections of the turbine section 28, such as in the turbine sections 46 or 54 and turbine section 56. As can be appreciated, the thermal management system 60 is not limited to use of compressor air or to cooling turbine airfoils.

Figure 2:
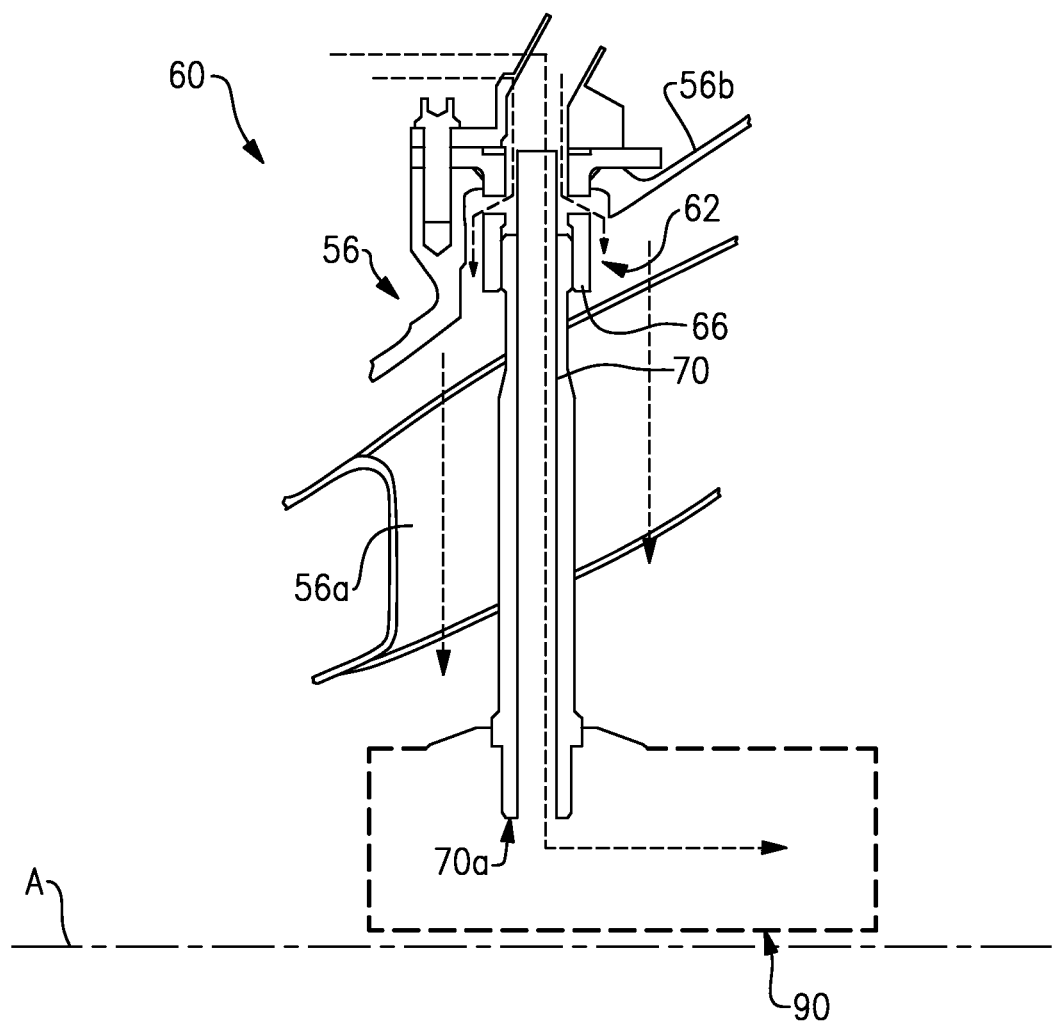
FIG. 2 illustrates a view of a portion of a thermal management system of the gas turbine engine of FIG. 1.

FIG. 2 shows a magnified view of a portion of the thermal management system 60 at the mid-turbine section 56 of the engine 20. As shown, the thermal management system 60 includes a metering device 62 that is located near an outer diameter of the core engine. The outer diameter is represented by the static engine case 56b. In the example shown, at least a portion of the metering device 62 is located radially outwards of the outer diameter of the core engine. A portion of the metering device 62 may extend radially inwards of the static engine case 56b as well, or the entire metering device 62 can be located radially outwards of the static case 56b. For example, at least a portion of the metering device 62 is at the outer diameter.

FIG. 3 shows a perspective, partial cutaway view of the metering device 62. FIG. 4 shows a radial view of the metering device 62 according to the view line shown in FIG. 2, and FIG. 5 shows another magnified view of the metering device 62. Referring to FIGS. 2-5, the metering device 62 includes a T-shaped tube 64 that has a tube portion 66 attached at a first end 66a to an orifice plate 68. The tube portion 66 is attached at a second, opposed end 66b to another tube 70 that is arranged coaxially with the tube portion 66. For example, the second end 66b of the tube portion 66 is connected in an interference fit with the tube 70.

Referring also to FIG. 6, the orifice plate 68 includes a plurality of orifices 72 that open into a first passage 74 and a central orifice 76 that opens into a second passage 78. In this example, the plurality of orifices 72 that open into the first passage 74 are arranged circumferentially around the central orifice 76 that opens into the second passage 78. As shown, the central orifice 76 is circular and the orifices 72 are non-circular. The disclosed shape and arrangement provides for a compact packaging arrangement, however, in other examples, other shapes could be used as packaging considerations permit.

The second passage 78 extends through the tube portion 66 of the T-shaped tube 64. The first passage 74 is an annular passage that extends between the periphery of the T-shaped tube 64 and an outer tube 80. The outer tube 80 is attached to the tube 70. For example, the outer tube 80 is interference fit with the tube 70 or includes threading or a threaded nut portion for mounting on the tube 70. The first passage 74 is thus concentric with the second passage 78. Additionally, the outer tube 80 includes a plurality of passages 82 that extend along respective axis that are oblique to the axis of the first passage 74 and the second passage 78.

As shown in FIG. 4, a fitting 84 is mounted over the orifice plate 68. The fitting 84 includes a port 84a for connecting the metering device 62 with a cooling stream source, such as the compressor section 24. If connected to the compressor section 24 to receive bleed air, such connections are known and therefore not described in further detail in this description.

Cooling air is provided through the thermal management system 60 into the port 84a and to the metering device 62. The metering device 62 divides the cooling stream into multiple segregated passages, which in the illustrated example include the first passage 74 and the second passage 78. It is to be appreciated however, that the metering device 62 could alternatively be configured to divide the cooling stream into additional segregated cooling passages.

The orifice plate 68, including the plurality of orifices 72 and the central orifice 76, serve to divide the cooling stream between the first passage 74 and the second passage 78. For example, the division of the cooling stream is determined by the relative areas of the plurality of orifices 72 in comparison to the area of the central orifice 76. Thus, by adjusting the relative sizes of the orifices 72/76, the cooling stream can be divided as desired between the first passage 74 and the second passage 78 to thus meter respective flows to the first passage 74 and the second passage 78. The location of the orifice plate 68 near the outer diameter of the core engine can also permit the orifice plate 68 to be relatively easily retrofit into an existing system, and can permit an existing orifice plate 68 to be replaced with a similar or resized orifice plate 68. Further, the orifice plate 68 is a relatively low-cost component and can be accessed at the outer diameter of the core engine without extensive disassembly of engine components.

The flow through the first passage 74 and the second passage 78 can then be provided to different components of the engine 20. For example, the different components can be a first turbine section and a second turbine section that is located downstream from the first turbine section. In a further example, the first passage 74 provides cooling air to the mid-turbine section 56 and the second passage 78 provides cooling air to the first turbine section 46.

The flow of the cooling stream that is conveyed through the central orifice 76 and into the second passage 78 is fed into the tube 70, which extends through the airfoil 56a in the mid-turbine section 56. As shown in FIG. 2, the tube 70 extends into an outer diameter of the airfoil 56a, through the airfoil 56a and out of an inner diameter of the airfoil 56a. The tube 70 terminates at an end 70a in the core engine. For example, the area surrounding the end 70a of the tube 70 may be within a torque box 90 of the engine 20. Thus, the cooling air provided through the tube 70 is fed into the interior of the torque box 90 and then subsequently fed through feed channels to the turbine section 46, for example.

The portion of the cooling stream that is divided and flows through the first passage 74 flows between the periphery of the tube portion 66 and the outer tube 80. The cooling air turns and flows through the plurality of passages 82 and then around an exterior of the outer tube 80 and into the airfoil 56a. This air serves to purge the interior of the airfoil 56a. For example, the cooling air flowing through the first passage 74a enters at the outer diameter of the airfoil 56a, flows through the airfoil 56a, and exits at the inner diameter of the airfoil 56a. This cooling air may then be bled off through leak paths into the core flow through the engine 20.

The thermal management system 60 thus provides a design that permits separate metering of multiple flow streams from a single source stream. Separate metering of multiple flow streams from a single source stream provides discrete air to separate engine components, which benefits flow balancing and safeguards flow disruption to priority cavities. The metering orifices can be provided in appropriate numbers and sizes such to segregate the flow according to the needs of the destination component(s).

Additionally, the disclosed example also provide packaging benefits by reducing the number of external feed lines required and reducing or eliminating a need for separate metering for two flow streams (e.g., MTF cavity and LPT rotor cavity). Engine derivatives can also benefit from metering capabilities and packaging benefits. The disclosed arrangement can also be employed to meter and segregate separate flow streams and can be applied in non-gas turbine applications.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a core engine including,
      a compressor section,
      a combustor in fluid communication with the compressor section, and
      a turbine section in fluid communication with the combustor; and
      a thermal management system configured to receive a cooling stream, the thermal management system including a metering device located near an outer diameter of the core engine, the metering device being configured to divide the cooling stream into multiple segregated passages, the metering device including an inner tube and an outer tube that is concentric with the inner tube, and the multiple segregated passages including a first passage defined between the outer tube and the inner tube and a second passage within the inner tube.

2. The gas turbine engine as recited in claim 1, wherein the thermal management system is connected to the compressor section and the cooling stream is bleed air.

3. The gas turbine engine as recited in claim 1, wherein the metering device is located at the outer diameter of the turbine section.

4. The gas turbine engine as recited in claim 1, wherein the turbine section includes a first turbine section and a second turbine section downstream of the first turbine section, and the outer diameter is of the first turbine section.

5. The gas turbine engine as recited in claim 4, wherein at least one of the multiple segregated passages leads to the second turbine section.

6. The gas turbine engine as recited in claim 1, wherein at least a portion of the metering device is located radially outwards of the outer diameter relative to a central axis of the core engine.

7. The gas turbine engine as recited in claim 1, wherein the inner tube and the outer tube extend into a radially outer end of an airfoil, through the airfoil and out from a radially inner end of the airfoil.

8. The gas turbine engine as recited in claim 1, wherein the inner tube and the outer tube extend through an airfoil.

9. The gas turbine engine as recited in claim 1, wherein the inner tube includes an end that is attached with an orifice plate, the orifice plate having a central opening and a plurality of orifices located circumferentially around the central opening, the plurality of orifices opening into the first passage.

10. The gas turbine engine as recited in claim 9, further comprising a fitting mounted over the orifice plate, the fitting including a port for connecting with a cooling stream source.

11. The gas turbine engine as recited in claim 9, wherein each of the plurality of orifices are circumferentially elongated.

12. A gas turbine engine comprising:
   a core engine including,
      a compressor section,
      a combustor in fluid communication with the compressor section, and
      a turbine section in fluid communication with the combustor, the turbine section includes a first turbine section, a second turbine section that is located downstream from the first turbine section, and a mid-turbine section axially between the first turbine and the second turbine; and
      a thermal management system operable to receive a cooling stream, the thermal management system including a metering device that is configured to divide the cooling stream between a first passage leading to the mid-turbine section and a second passage that is concentric with the first passage and leading to the first turbine section.

13. The gas turbine engine as recited in claim 12, wherein the metering device includes a plurality of orifices opening to the first passage and a central orifice opening to the second passage.

14. The gas turbine engine as recited in claim 13, wherein the plurality of orifices are arranged circumferentially around the central orifice.

15. The gas turbine engine as recited in claim 12, wherein the first passage is an annular passage.

16. The gas turbine engine as recited in claim 12, wherein the metering device includes a t-shaped tube having a tube portion attached at one end to an orifice plate.

17. The gas turbine engine as recited in claim 16, wherein the tube portion is attached at an opposed end to another tube extending coaxially therewith.

18. The gas turbine engine as recited in claim 12, wherein the metering device is located near an outer diameter of the core engine.

19. The gas turbine engine as recited in claim 12, wherein the first passage and the second passage extend into a radially outer end of an airfoil, through the airfoil and out from a radially inner end of the airfoil.

20. The gas turbine engine as recited in claim 12, wherein the first turbine is on a first rotatable shaft and the second turbine is on a second, different rotatable shaft.

21. The gas turbine section as recited in claim 12, wherein the metering device includes an inner tube and an outer tube that is concentric with the inner tube, the first passage defined between the outer tube and the inner tube and the second passage within the inner tube.

* * * * *